United States Patent
Tamura et al.

(10) Patent No.: US 7,052,568 B2
(45) Date of Patent: May 30, 2006

(54) TIRE RETREADING METHOD

(75) Inventors: Akira Tamura, Hanno (JP); Tomizo Kiyosue, Saitama (JP)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 184 days.

(21) Appl. No.: 10/281,780

(22) Filed: Oct. 28, 2002

(65) Prior Publication Data

US 2004/0079470 A1   Apr. 29, 2004

(51) Int. Cl.
*B29D 30/54* (2006.01)
*B29D 30/62* (2006.01)

(52) U.S. Cl. ............... 156/96; 156/130; 156/244.13; 156/244.18; 156/259; 264/36.14

(58) Field of Classification Search ............. 156/96, 156/117, 111, 123, 128.1–130, 244.13, 244.15, 156/244.25, 394.1, 396, 909, 405.1, 406.4, 156/244.18, 259; 152/209.5, 209.6; 264/36, 264/14, 175
See application file for complete search history.

(56) References Cited

U.S. PATENT DOCUMENTS

| | | | | |
|---|---|---|---|---|
| 2,345,518 A | * | 3/1944 | Wendel ................. | 152/209.17 |
| 2,649,891 A | * | 8/1953 | Hinman ...................... | 156/127 |
| 2,734,553 A | * | 2/1956 | Rawls .......................... | 156/96 |
| 2,958,098 A | * | 11/1960 | Barwell et al. ............. | 425/380 |
| 3,223,573 A | * | 12/1965 | Deist .......................... | 156/396 |
| 3,464,874 A | * | 9/1969 | Ragan .......................... | 156/96 |
| 3,717,529 A | * | 2/1973 | Rattray et al. .............. | 156/130 |
| 3,753,821 A | | 8/1973 | Ragen .......................... | 156/96 |
| 3,830,275 A | * | 8/1974 | Russell ..................... | 152/209.5 |
| 3,944,458 A | * | 3/1976 | Branick ....................... | 156/412 |
| 3,975,126 A | * | 8/1976 | Wireman et al. ............ | 425/141 |
| 4,098,936 A | | 7/1978 | Rawls ........................... | 428/40 |
| 4,240,863 A | | 12/1980 | Vinton .......................... | 156/361 |
| 4,279,683 A | * | 7/1981 | Landsness ................... | 156/397 |
| 4,336,012 A | | 6/1982 | Koch et al. .............. | 425/131.1 |
| 4,405,547 A | | 9/1983 | Koch et al. ................. | 264/171 |
| 4,490,197 A | | 12/1984 | Bajer ........................... | 156/64 |
| 4,927,482 A | * | 5/1990 | Capelle ....................... | 156/243 |
| 4,963,207 A | | 10/1990 | Laurent ...................... | 156/117 |
| 5,128,077 A | | 7/1992 | Stevenson et al. ......... | 264/40.2 |
| 5,162,070 A | | 11/1992 | Meyer ......................... | 156/500 |
| 5,167,894 A | * | 12/1992 | Baumgarten ................ | 264/175 |
| 5,171,394 A | | 12/1992 | Laurent ...................... | 156/397 |
| 5,221,406 A | | 6/1993 | Laurent ...................... | 156/397 |
| 5,364,490 A | | 11/1994 | Hilke et al. ................. | 156/396 |
| 5,447,587 A | * | 9/1995 | Bibona et al. ............... | 156/64 |
| 5,458,727 A | | 10/1995 | Meyer ...................... | 156/405.1 |
| 5,527,499 A | | 6/1996 | Miley ........................ | 264/40.1 |
| 5,843,349 A | | 12/1998 | Anders et al. ............. | 264/40.5 |

(Continued)

FOREIGN PATENT DOCUMENTS

EP         794049 A2  *  9/1997

(Continued)

*Primary Examiner*—Geoffrey L. Knable
(74) *Attorney, Agent, or Firm*—Steven M. Auvil

(57) ABSTRACT

A retreading method wherein a base composition and a cap composition are applied to a carcass (10) as two ribbons (14) and (16) extruded from separate extruders (18) and (20). The ribbons (14) and (16) can be layered and applied to a ready-to-retread carcass (10) simultaneously or, alternatively, the base ribbon (14) can be applied to the ready-to-retread carcass (10) first and the cap ribbon (16) applied thereafter. The carcass (10), with ribbons (14/16) applied thereto, is then inserted into an enclosed heated mold (22) and cured to complete the retread.

6 Claims, 3 Drawing Sheets

U.S. PATENT DOCUMENTS

| | | | |
|---|---|---|---|
| 6,190,479 B1 | 2/2001 | DuMars et al. | 156/129 |
| 6,372,070 B1 * | 4/2002 | Iizuka et al. | 156/117 |
| 6,699,344 B1 * | 3/2004 | Sergel et al. | 156/130 |

FOREIGN PATENT DOCUMENTS

| | | | |
|---|---|---|---|
| JP | 2000-43158 A | * | 2/2000 |
| JP | 2002-46194 A | * | 2/2002 |

* cited by examiner

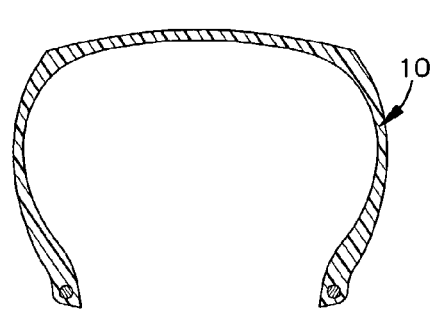
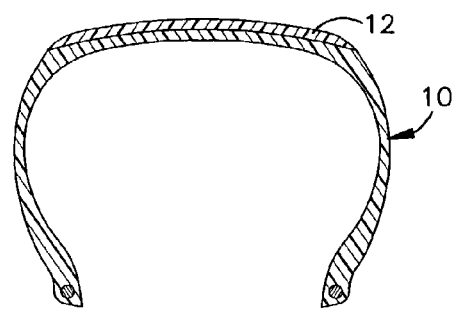
Figure 1A
Figure 1B
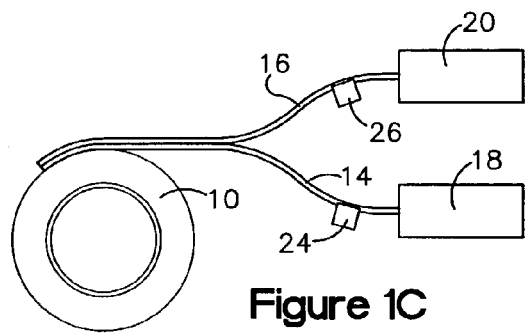
Figure 1C
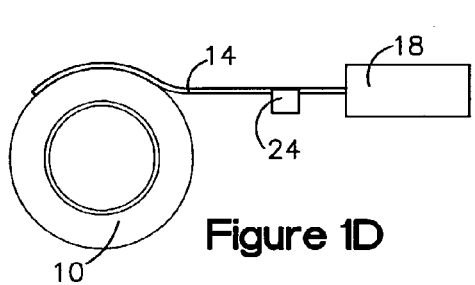
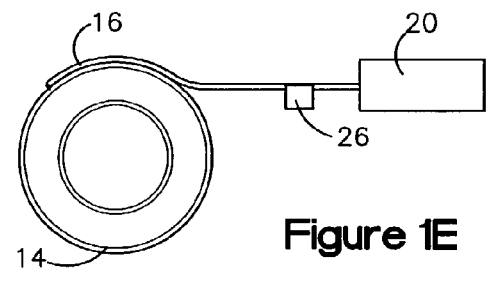
Figure 1D
Figure 1E
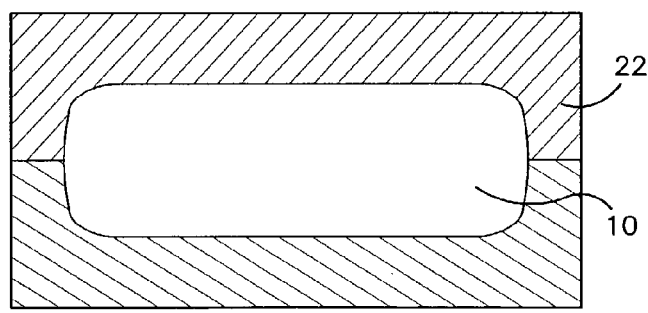
Figure 1F

TIRE RETREADING METHOD

FIELD OF THE INVENTION

The present invention relates generally as indicated to a tire retreading method and, more particularly, to a method for replacing a worn tread on a previously used pneumatic tire carcass.

BACKGROUND OF THE INVENTION

The retreading of pneumatic tires is a common practice, as it allows the original casing (or carcass) of a tire to be reused once the tread has served its useful life. A conventional retreading process comprises extruding a body of uncured rubber ("camel-back") onto a previously used tire carcass. The extruded body of rubber consists of a base composition and a cap composition selected to match retread requirements. The "camel-backed" casing is then inserted into an enclosed heated mold and cured. The tread pattern is impressed on the blank in the mold and is bonded to the casing by the application of heat and pressure.

SUMMARY OF THE INVENTION

The present invention provides a retreading process, wherein the base composition and the cap composition are applied to the carcass as two separate ribbons provided from separate extruders.

More particularly, the present invention provides a method of retreading a pneumatic tire, comprising the steps of providing a ready-to-retread tire carcass, applying a base composition and a cap composition to the carcass as two ribbons extruded from separate extruders, and curing the carcass. The ribbons can be applied to the carcass simultaneously or, alternatively, the ribbons can be applied to the carcass sequentially. In either event, the separate-ribbon application method of the present invention offers several advantages over the conventional camel-back process. For example, gauge control and adjustments are easier to accomplish, thereby streamlining skilled personnel supervision. Also, ribbon size can be conveniently modified without requiring a die change. Additionally, tread surface temperature is easier to maintain, thereby improving the quality and productivity of the retread operation. Further, waste rubber can be recycled because unused base composition and unused cap composition can be returned to their respective extruders.

The present invention provides these and other features hereinafter fully described and particularly pointed out in the claims. The following description and drawings set forth in detail certain illustrative embodiments of the invention. These embodiments are indicative, however, of but a few of the various ways in which the principles of the invention can be employed.

DRAWINGS

FIGS. 1A–1F are schematic illustrations of steps of retreading methods according to the present invention.

DETAILED DESCRIPTION

Figure 2:
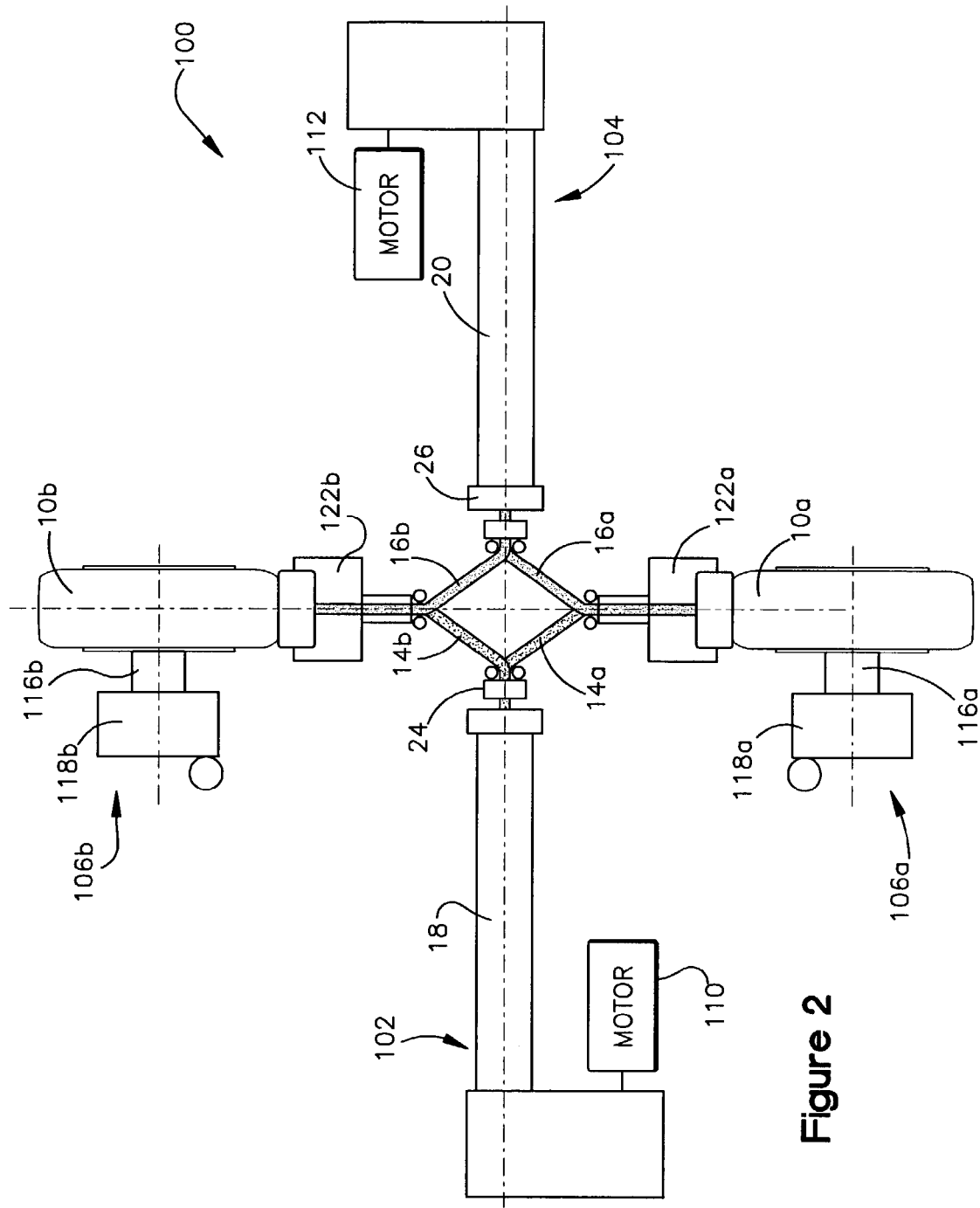
FIG. 2 is a schematic top view of a system for practicing the ribbon-applying steps of the method of the present invention.

Referring now to the drawings, and initially to FIGS. 1A–1F, a retreading method according to the present invention is schematically shown. In this method, a previously used pneumatic tire is initially de-treaded (i.e., the worn tread is removed), contoured, conditioned and treated to form a retread candidate carcass 10. (FIG. 1A.) A cushion gum layer 12 is then applied to the carcass 10. (FIG. 1B.) A base composition and a cap composition are applied to the gummed carcass 10 as two ribbons 14 and 16 extruded from separate extruders 18 and 20. (FIG. 1C or FIGS. 1D and 1E.) The carcass 10 (with ribbons 14/16 applied thereto) is then inserted into an enclosed heated mold 22 and cured to complete the retread. (FIG. 1F.)

Preferably, the carcass 10 is rotated relative to the extruders 18 and 20 during application of the ribbons 14 and 16. (FIGS. 1C, 1D and 1E.) Also preferably, the ribbons 14 and 16 pass through festoon rolls 24 and 26 to impart the appropriate curvature. (FIGS. 1C, 1D and 1E.) The ribbons 14 and 16 can be layered and applied to the carcass 10 simultaneously. (FIG. 1C.) Alternatively, the base ribbon 14 can be applied to the carcass 10 first, and the cap ribbon 16 applied thereafter. (FIGS. 1D and 1E.)

Referring now to FIG. 2, a system 100 for practicing the ribbon-applying steps of the retreading method of the present invention is schematically shown. The system 100 is designed to accommodate two carcasses 10a and 10b at a time and comprises an extruder station 102 for the base composition, an extruder station 104 for the cap composition, and two tire stations 106a and 106b.

The extruder station 102 includes the extruder 18 and a motor 110 therefor, and the extruder station 104 includes the extruder 20 and a motor 112 therefor. The festoon rollers 24 and 26 are positioned just downstream of the exits (or heads) of the extruders 18 and 20, respectively. A divider is provided at the extruder station 102 to divide the base composition ribbon 14 into ribbons 14a and 14b and a divider is provided at the extruder station 104 to divide the cap composition ribbon 16 into ribbons 16a and 16b. Each tire station 106a/106b includes a shaft 116a/116b for receiving a ready-to-retread carcass 10 and a winding mechanism 118a/118b to rotate the shaft 116a/116b. Calenders 122a and 122b are positioned just upstream of the tire stations 106a and 106b, respectively.

The ready-to-retread carcasses 10a and 10b are placed on the shafts 116a and 116b, respectively, and the shafts are turned to rotate the carcasses relative to the ribbons 14a/14b and 16a/16b. The ribbons 14a and 16a pass through the calender 112a and the ribbons 14a and 16a are substantially simultaneously applied to the carcass 10a. Likewise, the ribbons 14b and 16b pass through the calender 112b and the ribbons 14b and 16b are substantially simultaneously applied to the carcass 10b.

After the calendered ribbons have been applied to the entire circumference of the carcass 10a/10b, the carcass 10a/10b is withdrawn from the shaft 14a/14b and ready for the curing step of the retreading process.

Figure 3:
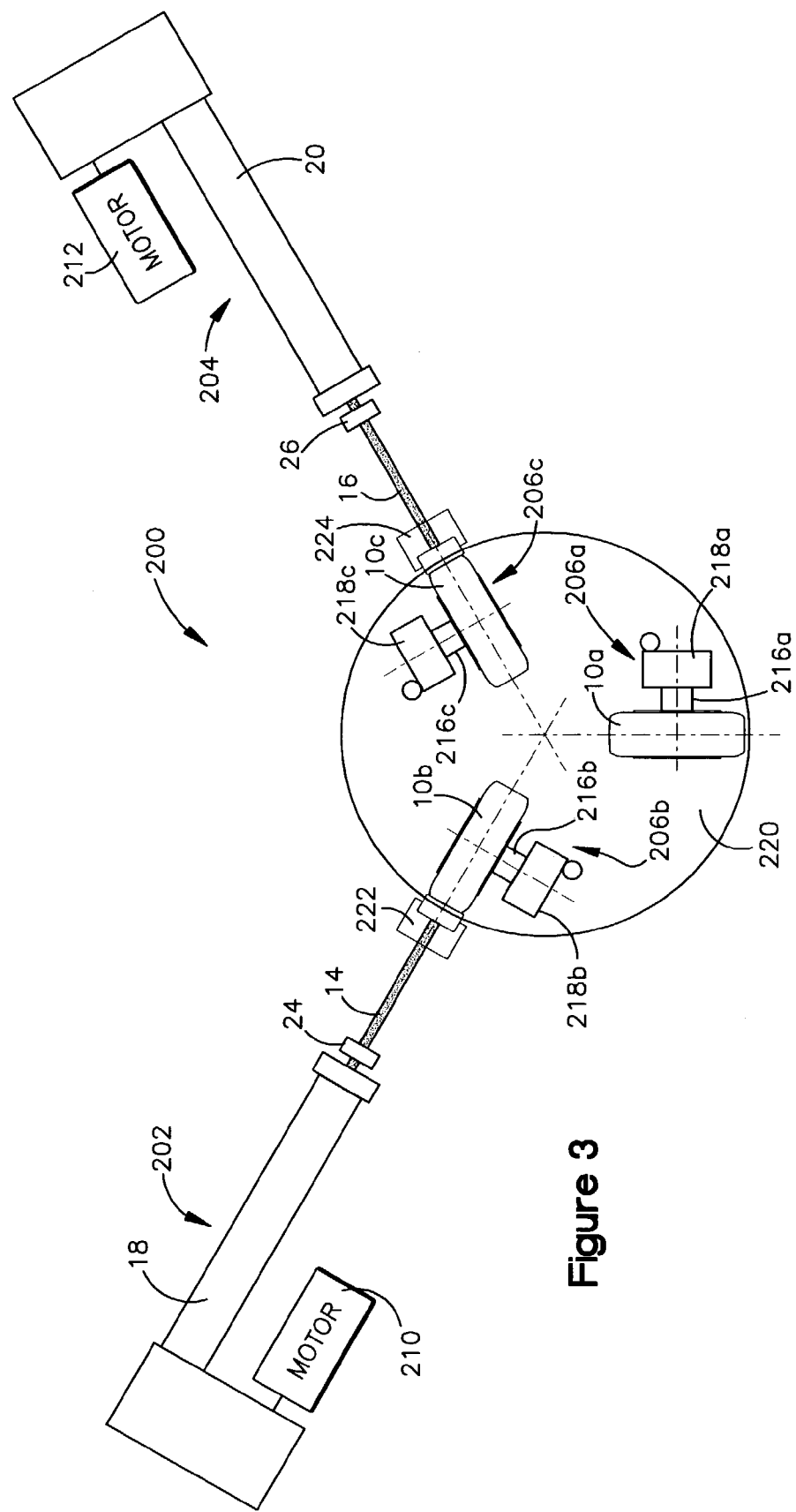
FIG. 3 is a schematic top view of another system for practicing the ribbon-applying steps of the method of the present invention.

Referring now to FIG. 3, another system 200 for practicing the ribbon-applying steps of the retreading method of the present invention is schematically shown. The system 200 is designed to accommodate three carcasses 10 at a time and comprises an extruder station 202 for the base composition, an extruder station 204 for the cap composition, and tire stations 206a, 206b and 206c.

The extruder station 202 includes the extruder 18 and a motor 210 therefor, and the extruder station 204 includes the extruder 220 and a motor 212 therefor. The festoon rolls 24 and 26 are positioned just downstream of the exits (or heads) of the extruders 18 and 20, respectively. Each tire station 206 includes a winding shaft 216 for receiving a ready-to-retread carcass 10 and a winding mechanism 218 for rotating the shaft 216. The tire stations 206a, 206b and 206c are mounted on a turntable 220 at positions approximately 120° apart so that each station 206 can be moved from a loading/unloading position, to a base-applying position, to a coat-applying position, and back to the loading/unloading position. Calenders 224 and 226 are positioned just upstream of the base-applying position and the coat-applying position.

During operation of the system 200, a first ready-to-retread carcass 10a is loaded on the tire station 206a and the turntable 220 moves the first carcass 10a to the base-applying position. A second ready-to-retread carcass 10b is loaded on the tire station 206b (now in the loading/unloading position) while the base ribbon 14 is applied to the first carcass 10a. The turntable 220 then moves the first tire station 206a to the coat-applying position and the second tire station 206b to the base-applying position. A ready-to-retread carcass 10c is loaded on the third tire station 206c (now in the loading/unloading position) while the cap ribbon 16 is applied to the first carcass 10a and the base ribbon 14 is applied to the second carcass 10b. The turntable 208 then moves the first tire station 206a back to the loading/unloading position, the second tire station 206b to the cap-applying position, and the third tire station 206c to the base-applying position. The carcass 10a can be removed from the first tire station 206a (ready for the curing step), a further ready-to-retread carcass placed on the first tire station 206a, and the process repeated.

The application of the base composition and a cap composition as two ribbons 14 and 16 extruded from separate extruders 18 and 20 provides several advantages over the conventional process of "camel-backing" these compositions. For example, gauge control and adjustments are easier to accomplish, thereby streamlining skilled personnel supervision. Also, ribbon size can be conveniently modified without requiring a die change. Additionally, tread surface temperature is easier to maintain, thereby improving the quality and productivity of the retread operation. Further, waste rubber can be recycled because unused base composition and unused cap composition can be returned to their respective extruders. (It is almost impossible to separate base and cap composition in a camel-back extrusion.) These and other advantages provide a much more economic and efficient retreading method.

Although the invention has been shown and described with respect to certain embodiments, it is obvious that equivalent alterations and modifications will occur to others skilled in the art upon the reading and understanding of this specification. The present invention includes all such alterations and modifications and, moreover, is limited only by the scope of the following claims.

The invention claimed is:

1. A method of retreading a pneumatic tire comprising the steps of:
    providing at least one ready-to-retread tire carcass;
    applying a base composition layer and a cap composition layer to the carcass; and
    curing the carcass;
        wherein the applying step is performed by a system designed to accommodate first and second ready-to-retread carcasses and comprising an extruder station for the base composition layer, an extruder station for the cap composition layer and first and second tire stations;
        wherein the extrudate from the extruder station for the base composition layer is divided into a first base ribbon and a second base ribbon, wherein the extrudate from the extruder station for the cap composition layer is divided into a first cap ribbon and a second cap ribbon, and wherein the first base ribbon and the first cap ribbon are applied to the first ready-to-retread carcass and the second base ribbon and the second cap ribbon are applied to the second ready-to-retread carcass.

2. The method as set forth in claim 1, wherein the first base ribbon and the first cap ribbon pass through a calender upstream to the first tire station and are simultaneously applied to the first ready-to-retread carcass, wherein the second base ribbon and the second cap ribbon pass through a calender upstream of the second tire station and are simultaneously applied to the second ready-to-retread carcass.

3. The method as set forth in claim 2, wherein the first base ribbon and the first cap ribbon are simultaneously applied to the first ready-to-retread carcass via a winding mechanism.

4. The method as set forth in claim 2, wherein the second base ribbon and the second cap ribbon are simultaneously applied to the second ready-to-retread carcass via a winding mechanism.

5. The method as set forth in claim 1, wherein the step of providing at least one ready-to-retread carcass comprises detreading, contouring, conditioning, and/or treating a previously used pneumatic tire.

6. The method as set forth in claim 5, further comprising the step of applying a cushion gum layer to the at least one ready-to-retread carcass prior to the applying step.

* * * * *